(12) United States Patent
Chang et al.

(10) Patent No.: US 10,746,986 B2
(45) Date of Patent: Aug. 18, 2020

(54) OPTICAL ELEMENT AND DISPLAY DEVICE USING THE SAME

(71) Applicant: CM VISUAL TECHNOLOGY CORPORATION, Tainan (TW)

(72) Inventors: Hsin-Wen Chang, Tainan (TW); Hung-Yu Lin, Tainan (TW); Yung-Pin Chen, Tainan (TW)

(73) Assignee: CM VISUAL TECHNOLOGY CORPORATION, Tainan (TW)

( * ) Notice: Subject to any disclaimer, the term of this patent is extended or adjusted under 35 U.S.C. 154(b) by 0 days.

(21) Appl. No.: 15/964,440

(22) Filed: Apr. 27, 2018

(65) Prior Publication Data

US 2018/0321487 A1 Nov. 8, 2018

(30) Foreign Application Priority Data

May 5, 2017 (TW) .............................. 106114904 A

(51) Int. Cl.
| | | |
|---|---|---|
| *F21V 8/00* | (2006.01) | |
| *G02B 5/18* | (2006.01) | |
| *G02B 27/00* | (2006.01) | |
| *G02B 27/60* | (2006.01) | |

(52) U.S. Cl.
CPC ....... *G02B 27/0025* (2013.01); *G02B 5/1823* (2013.01); *G02B 6/0053* (2013.01); *G02B 27/60* (2013.01)

(58) Field of Classification Search
CPC .... G02B 3/0056; G02B 3/0037; G02B 3/005; G02B 27/123; G02B 6/0053; G02B 5/1823; G02B 5/1866; G02B 5/1819; G02B 5/1861; G02B 2005/1804; G02B 5/18; G02B 5/1828
USPC .......................................... 359/617–620, 575
See application file for complete search history.

(56) References Cited

U.S. PATENT DOCUMENTS

| | | | |
|---|---|---|---|
| 7,278,771 B2 | 10/2007 | Campbell | |
| 10,551,531 B2 | 2/2020 | Ko | |
| 2007/0279773 A1* | 12/2007 | Johnson | ................. G02B 5/045 359/831 |
| 2018/0059303 A1* | 3/2018 | Chung | ................... G02B 6/005 |

FOREIGN PATENT DOCUMENTS

| | | |
|---|---|---|
| CN | 101061397 A | 10/2007 |
| CN | 102608798 A | 7/2012 |
| CN | 103185908 A | 7/2013 |
| CN | 204462427 U | 7/2015 |
| TW | 200807030 A | 2/2008 |

* cited by examiner

*Primary Examiner* — Ryan D Howard
(74) *Attorney, Agent, or Firm* — McClure, Qualey & Rodack, LLP

(57) ABSTRACT

An optical element including a first pattern is provided. The first pattern includes a plurality of light deflection regions arranged along at least one set of first tracks in a first direction, and each first track is a waveform track having a first period $T_1$ and a first amplitude $A_1$.

18 Claims, 10 Drawing Sheets

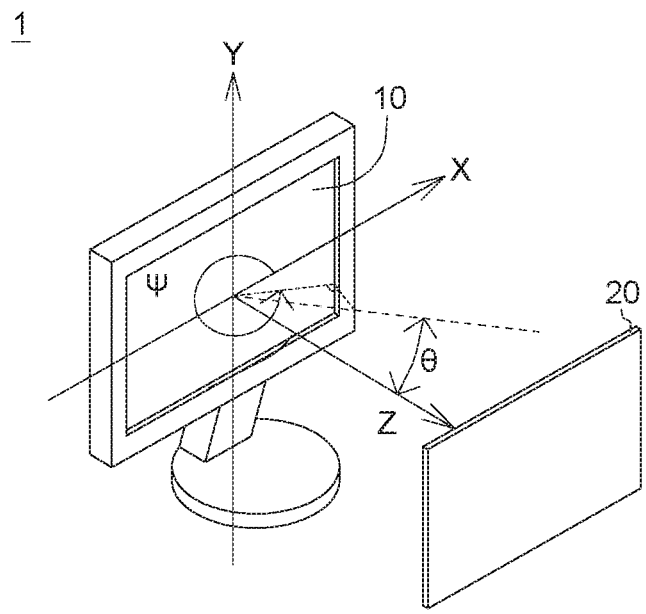
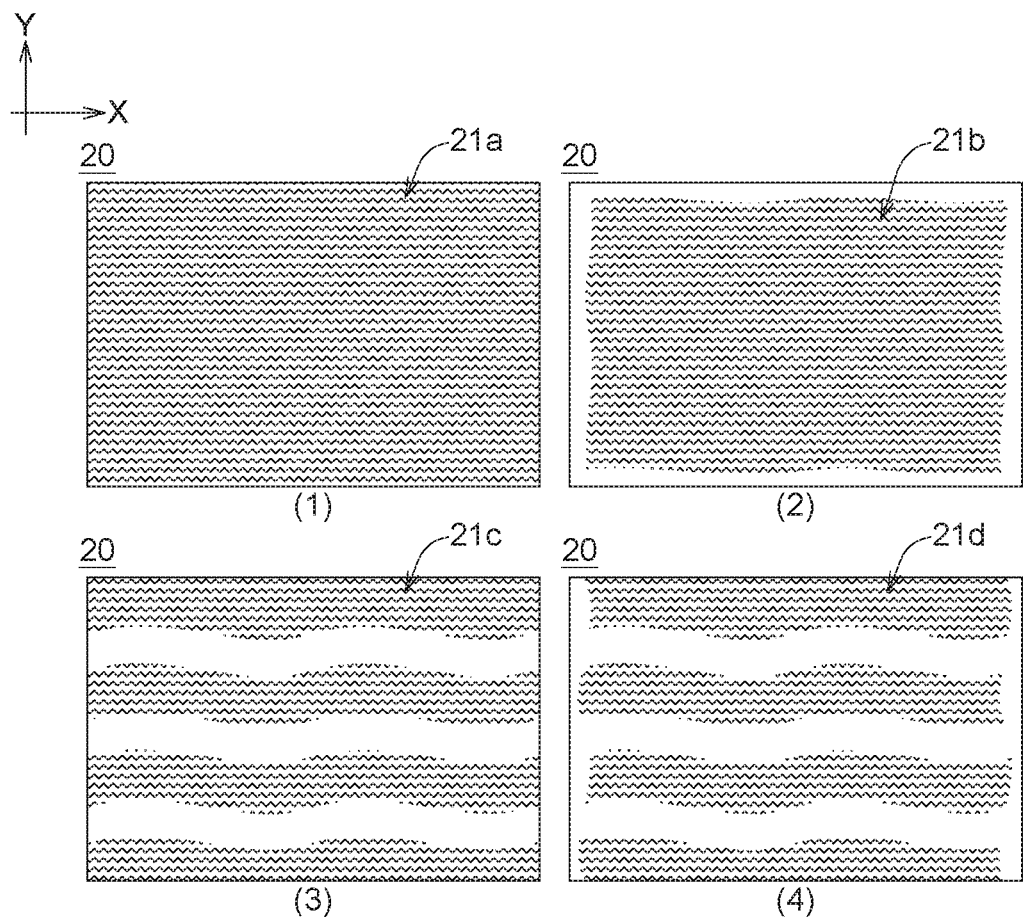
FIG. 1A
FIG. 1B

63a

63b

63c

OPTICAL ELEMENT AND DISPLAY DEVICE USING THE SAME

This application claims the benefit of Taiwan application Serial No. 106114904, filed May 5, 2017, the disclosure of which is incorporated by reference herein in its entirety.

TECHNICAL FIELD

The disclosure relates in general to an optical element and a display, and more particularly to an optical element for deflecting the light and a display device using the same.

BACKGROUND

The current display includes many structures arranged periodically with a regular period. If the micro-structures of the optical film disposed on the display have a pre-determined period, two periodic structures having different periods may generate a moiré interference pattern, which severely affects the display quality. Therefore, it has become a prominent task for the industries to develop an optical film without the moiré interference pattern issue.

SUMMARY

The disclosure is directed to an optical element and a display device using the same capable of eliminating the moiré interference pattern formed from the interference between periodically arranged structures.

According to one embodiment, an optical element including a plurality of light deflection regions arranged along at least one set of first tracks in a first direction is provided. Each first track is a waveform track having a first period $T_1$ and a first amplitude $A_1$.

According to another embodiment of the invention, an optical element including a film and a plurality of light deflection regions is provided. The light deflection regions are arranged on the film, and each light deflection region comprises diffraction structures having two or more than two types of periods.

According to an alternate embodiment of the invention, a display device is provided. The display device includes a display and an optical element disposed on a light output surface of the display.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 1A is a schematic diagram of an optical element and a display device using the same according to an embodiment of the invention.

FIG. 1B is a schematic diagram of four implementations of an optical element.

DETAILED DESCRIPTION

Figure 2A:
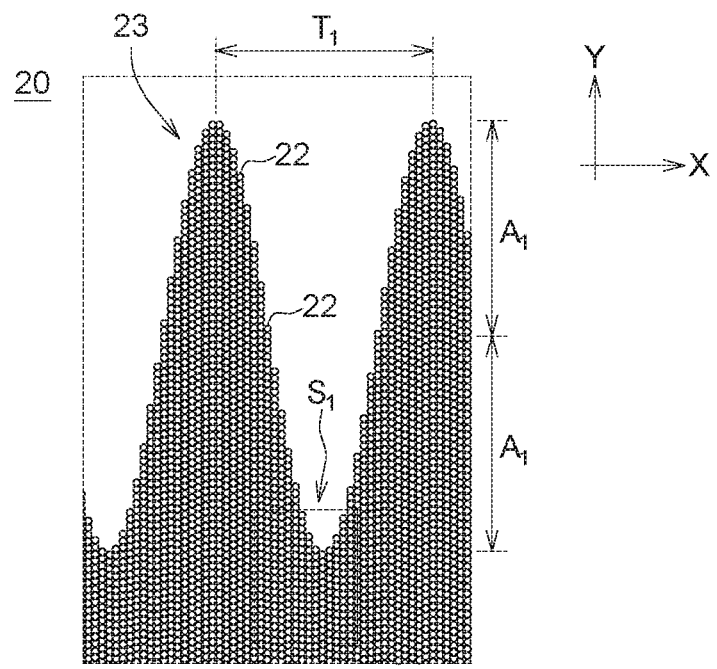
FIGS. 2A and 2B respectively are schematic diagrams of the light deflection regions arranged along the tracks in a first direction and an enlarged view of a region $S_1$.

A number of embodiments are disclosed below for elaborating the invention. However, the embodiments of the invention are for detailed descriptions only, not for limiting the scope of protection of the invention.

Refer to FIG. 1A. The display device 1 includes a display 10 and an optical element 20. The optical element 20 is disposed on a light output surface of a display 10 for displaying an image. The display 10 can be a liquid crystal display, a plasma display, an organic light-emitting diode (OLED) display, an electronic paper display or other display for displaying an image. Meanwhile, the display 10 can be combined with other element. For example, the display 10 can be combined with a touch element to form a touch panel. The optical element 20 and other element (such as an anti-reflection film or a touch panel) can be disposed on the light output surface of the display 10.

The optical element 20 can be realized by a film having deflection structures for deflecting the light emitted by the display 10. Based on the principles of the spherical coordinate system, two mutually perpendicular lines on a plane parallel to the display surface of the display 10 are defined as coordinate axes. Normally, the horizontal line directed rightward is defined as the X axis, the vertical line directed upwards is defined as the Y axis, and the axis perpendicular to the display surface of the display 10 is defined as the Z axis. Thus, the observation angle for watching the display 10 is represented by a zenith angle $\theta$ and a directional angle $\psi$ of the spherical coordinate system, wherein, the directional angle $\psi$ is formed by an angle with respect to the X axis on the XY plane and can range from 0° to 360°; the zenith angle $\theta$ is formed by an angle with respect to the Z axis and can range from +90° to −90°. Any two directions can form an angle. The angle represented by an anti-clockwise direction is a positive angle, and the angle represented by a clockwise direction is a negative angle. In an embodiment, the axial line parallel to the horizontal line can be defined as the X axis, the axial line parallel to the vertical line can be defined as the Y axis, and the third dimension perpendicular to the XY plane can be defined as the Z axis.

Refer to FIGS. 1A and 1B. In an embodiment, the optical element 20 includes at least one light deflection region and an ordinary region other than the light deflection region (a non-light-deflection region). When the light passing through the light deflection region at a specific direction, high deflection effect will be generated. High deflection effect refers to the ratio of the intensity of the zero-order deflected light (the output light without changing the propagation direction) to the intensity of the non-zero-order deflected light (the output light changed the propagation direction) is lower than 100. When the light passing through the ordinary region at a specific direction, low deflection effect will be generated, and the luminous flux is increased. Low deflection effect refers to the ratio of the intensity of the zero-order deflected light (the output light without changing the propagation direction) to the intensity of the non-zero-order deflected light (the output light changed the propagation direction) is higher than 100. In another embodiment, the same effect can be achieved when the ordinary region (or the non-light-deflection region) is a non-translucent region which almost allows no light to pass through.

Refer to FIG. 1B. The optical element 20 has a first pattern including a plurality of light deflection regions formed by way of engraving, embossing, transferring or printing. The first pattern refers to the distribution pattern of the light deflection regions. The first pattern can have many implementations, but only four are exemplified below for illustration. In the first implementation (1), the light deflection regions are uniformly distributed over the entire optical element 20, that is, the first pattern 21a is equivalent to the size of the optical element 20. In the second implementation (2), the light deflection regions are distributed on the central region of the optical element 20 and form a non-light-deflection region on the boundary of the optical element 20, that is, the first pattern 21b is smaller than the size of the optical element 20. In the third implementation (3), the first pattern 21c is smaller than the size of the optical element 20 in one direction (such as the direction parallel to the Y axis as indicated in FIG. 1B) and two or more than two sets of first patterns can be arranged at intervals from one another along the said direction in a periodic manner. In the fourth implementation (4), the first pattern 21d is smaller than the size of the optical element 20 in two directions (such as the direction parallel to the X axis and the direction parallel to the Y axis) and two or more than two sets of first patterns can be arranged at intervals from one another along one of the two directions in a periodic manner. To summarize, the light deflection regions occupy 30-100% of the area of the optical element 20. In an embodiment, the light deflection regions occupy more than 90% of the area of the optical element 20. For example, the light deflection regions occupy 95-100% of the area of the optical element 20. It should be noted that, the border line of the first pattern can be a straight line or a waveform curve, and only the waveform track is exemplified in implementations (2)-(4).

In an embodiment, the light deflection regions of the first pattern can be arranged according to a periodic function in a first direction, that is, the light deflection regions are arranged along at least one periodic track. In another embodiment, the light deflection regions of the first pattern are not only arranged according to a first periodic function in the first direction but also arranged according to a second periodic function in a second direction different from the first direction. That is, the light deflection regions are arranged at the intersection between two periodic tracks. The periodic function can be exemplified by a waveform function. For example, the light deflection regions can be arranged along a first waveform track in a direction parallel to the X axis, wherein the first waveform track has a fixed period $T_1$ and a fixed amplitude $A_1$ perpendicular to the X axis direction. In another embodiment, the light deflection regions not only can be arranged along the first waveform track in a direction parallel to the X axis but also arranged along a second waveform track in a direction parallel to the Y axis, wherein the second waveform track has a fixed period $T_2$ and a fixed amplitude $A_2$ perpendicular to the Y axis direction. However, the first waveform track and the second waveform track can have variable periods or variable amplitudes, and the invention does not have specific restrictions thereto.

Figure 3A:
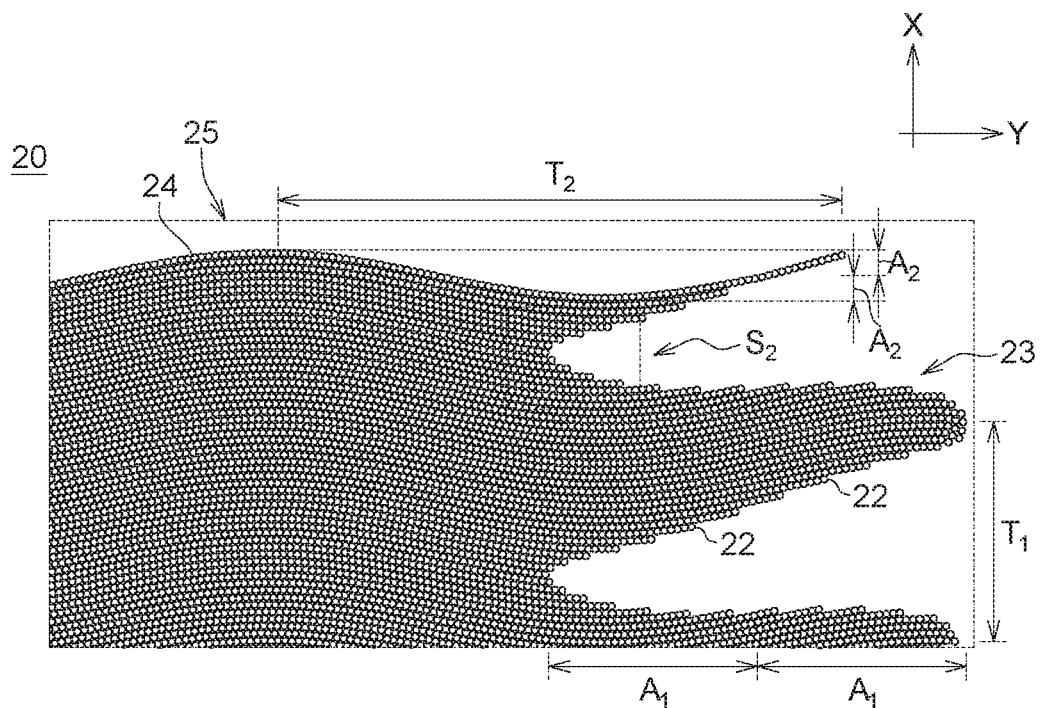
FIGS. 3A and 3B respectively are schematic diagrams of the light deflection regions arranged along the tracks in a first direction and a second direction and an enlarged view of a region $S_2$.

Possible arrangements of the light deflection regions are described below with accompanying drawings. Referring to FIGS. 2A and 3A, exemplary arrangements of some light deflection regions 22 on the optical element 20 are illustrated, wherein the blank part refers to the part which the light deflection regions 22 are omitted or refers to the non-light deflection region without deflection effect. Specifically, the optical element 20 has many light deflection regions 22 and 24, and the first pattern is formed by the light deflection regions 22 and 24. Each light deflection region can be a circle, an eclipse or a polygon such as triangle, square, pentagon or hexagon. The light deflection regions have a characteristic dimension D1. If the light deflection regions form a circle, the characteristic dimension D1 is defined as a diameter. If the light deflection regions form a polygon, the characteristic dimension D1 is defined as a diameter of a circumcircle of the polygon. If the light deflection regions form an ellipse, the characteristic dimension D1 is defined as an arithmetic average of a long axis and a short axis. In other embodiments, based on the shape of the light deflection regions, the definition of the characteristic dimension can be adopted from a similar shape. In an embodiment, the characteristic dimension D1 can range from 4 to 80 µm, such as 30 to 60 µm or 20 to 70 µm. The light deflection regions can occupy 30%-100% of the area of the optical element.

Figure 2B:
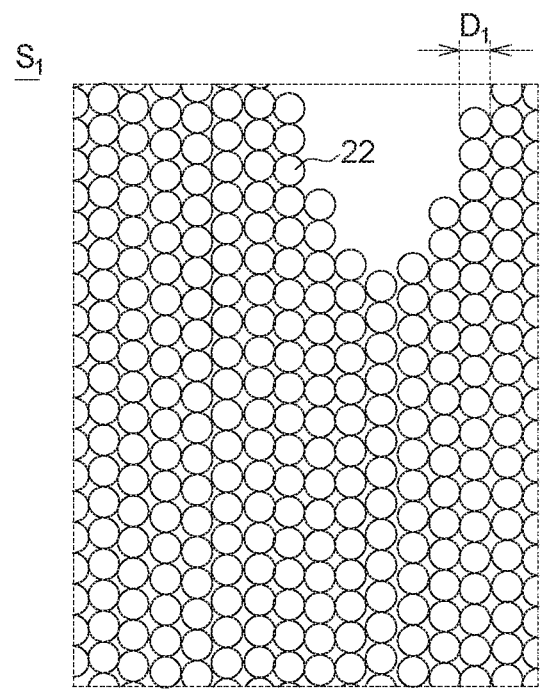

In an embodiment as indicated in FIGS. 2A and 2B, the light deflection regions 22 are arranged along a track 23 in a first direction (e.g. the direction of the directional angle ψ=0 or the direction parallel to the X axis). The track 23 is a waveform track having a first period $T_1$ and a first amplitude $A_1$, wherein the direction of first period is parallel to the first direction (the direction parallel to the X axis), the direction of first amplitude is perpendicular to the first direction (the direction perpendicular to the X axis). Here, the first period $T_1$ refers to the distance from crest to crest (or trough to trough), and the first amplitude $A_1$ refers to the distance from balance point to crest or trough and is equivalent to a half of the distance from crest to trough. The track 23 can be expressed as:

$$Y_1 = A_1 \sin\left(2\pi \frac{X_1}{T_1}\right).$$

In an embodiment, the first amplitude $A_1$ and the first period $T_1$ can be larger than or equivalent to two times of the characteristic dimension $D_1$ of the light deflection regions 22, that is, $A_1 \geq 2D_1$ and $T_1 \geq 2D_1$. Besides, the ratio of the first amplitude $A_1$ to the first period $T_1$ can be larger than 0 but smaller than 10, that is, $$0 < \frac{A_1}{T_1} \leq 10.$$

In another embodiment, $A_1 \geq 5D_1$ and $T_1 \geq 10D_1$. For example, the diameter $D_1$ of the circular light deflection regions 22 as indicated in FIGS. 2A and 2B is equivalent to 30 micro meters (µm), the first amplitude $A_1$ is equivalent to 1 millimeters (mm), and the first period $T_1$ is equivalent to 1 mm. In the present embodiment, the light deflection regions 22 are arranged along a straight line in a second direction (such as the direction of the directional angle ψ=90° or the direction parallel to the Y axis).

Figure 3B:
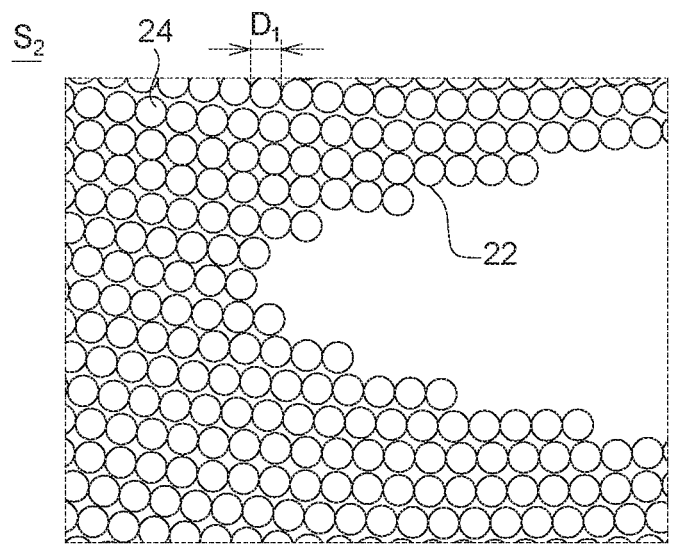

In another embodiment as indicated in FIGS. 3A and 3B, the light deflection regions 22 and 24 are arranged along a track 23 in a first direction (e.g. the direction of the directional angle ψ=0 or the direction parallel to the X axis) and are also arranged along a track 25 in a second direction (e.g. the direction of the directional angle ψ=90 or the direction parallel to the Y axis). That is, the light deflection regions 22 and 24 are arranged at the intersection between the track 23 and the track 25. The track 25 is a waveform track having a second period $T_2$ and a second amplitude $A_2$, wherein the direction of second period is parallel to the second direction (the direction parallel to the Y axis), and the direction of second amplitude is perpendicular to the second direction (the direction perpendicular to the Y axis). Here, the second period $T_2$ refers to the distance from crest to crest (or trough to trough), and the second amplitude $A_2$ refers to the distance from balance point to crest or trough and is equivalent to a half of the distance from crest to trough. The track 25 can be expressed as:

$$Y_2 = A_2 \sin\left(2\pi \frac{X_2}{T_2}\right).$$

In an embodiment, the second amplitude $A_2$ and the second period $T_2$ can be larger than or equivalent to two times of the characteristic dimensions $D_1$ of the light deflection regions 22 and 24, that is, $A_2 \geq 2D_1$ and $T_2 \geq 2D_1$. Besides, the ratio of the second amplitude $A_2$ to the second period $T_2$ can be larger than 0 but smaller than 1, that is, $$0 < \frac{A_2}{T_2} \leq 1.$$

For example, the diameter $D_1$ of the circular light deflection regions 22 as indicated in FIGS. 3A and 3B is equivalent to 30 μm, the first amplitude $A_1$ is equivalent to 1 mm, the first period $T_1$ is equivalent to 1 mm, the second amplitude $A_2$ is equivalent to 0.1 mm, and the second period $T_2$ is 3 mm. In an embodiment, the ratio of the first amplitude $A_1$ to the first period $T_1$ is larger than the ratio of the second amplitude $A_2$ to the second period $T_2$, that is, $$\frac{A_1}{T_1} > \frac{A_2}{T_2}.$$

The track 23 having the period $T_1$ and the amplitude $A_1$ gets steeper with the larger value of $$\frac{A_1}{T_1};$$

me track 25 having the period $T_2$ and the amplitude $A_2$ gets smoother with the smaller the value of $$\frac{A_2}{T_2}.$$

In an embodiment, the light deflection regions are arranged along the track 23 in the direction of the directional angle ψ=0±20° and are also arranged along the track 25 in the direction of the directional angle ψ=90±20°. That is, the track 23 and the track 25 have different directions, and the included angle formed by the track 23 and the track 25 can range from 50 to 130°. In another embodiment, the light deflection regions are arranged along the track 23 in the direction of the directional angle ψ=45±30° and are also arranged along the track 25 in the direction of the directional angle ψ=135±30°. That is, the included angle formed by the track 23 and the track 25 can range from 30 to 150°. Based on actual needs, the display device 1 of the invention can adjust the directional angles of the track 23 and 25 of the first pattern formed on the optical element 20 to generate different deflection effects.

In an embodiment, the track 23 is, for example, a sine function or an approximate sine function, and may include many types of periodic functions. The periodic functions are not limited to one, and can be a sum of different periodic functions. If the function of the track 23 is a sum of multiple periodic functions having the same period, the period of the track 23 is still the same. If the function of the track 23 is a sum of multiple periodic functions having different periods, the period of the track 23 is the least common multiple of the periods of the multiple periodic functions. For example, a function having a period of 6π can be produced by the sum of the function having a period of 2π and the function having a period of 3π. The function of the track 25 can be obtained by the same analogy, and the similarities are not repeated here. Thus, the track 23 and the track 25 can be obtained from the periodic functions having the same period or having different periods. Let a Fourier series f(t) be taken for example. The Fourier series f(t) is composed of sine functions and/or cosine functions, and can be expressed as:

$$f(t) = a_0 + \sum_{n=1}^{\infty} (a_n \cos(nt) + b_n \sin(nt)), \quad -\pi \leq t \leq \pi$$

Wherein, t ∈[−π, π], $a_n$ and $b_n$ represent amplitudes.

Figure 4A:
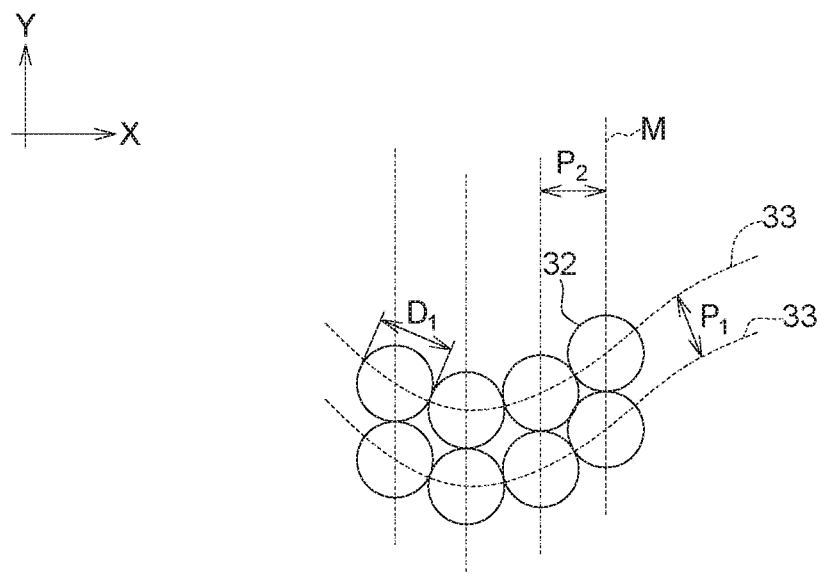
FIGS. 4A and 4B are schematic diagrams of two sets of light deflection regions arranged along the tracks.

To simplify the drawing, the following drawing illustrates only patterns formed of a part of the light deflection regions. In an embodiment as indicated in FIG. 4A, eight circular light deflection regions 32 are taken for illustration. The eight circular light deflection regions 32 are arranged into two adjacent groups with each group having four circular light deflection regions along a track 33 in a first direction (the directional angle ψ=0), and are arranged into four adjacent groups with each group having two circular light deflection regions along a straight line M in a second direction (the directional angle ψ=90). The two tracks 33 are arranged with a first pitch $P_1$ in the second direction, and four straight lines M are arranged with a second pitch $P_2$ in the first direction.

Figure 4B:
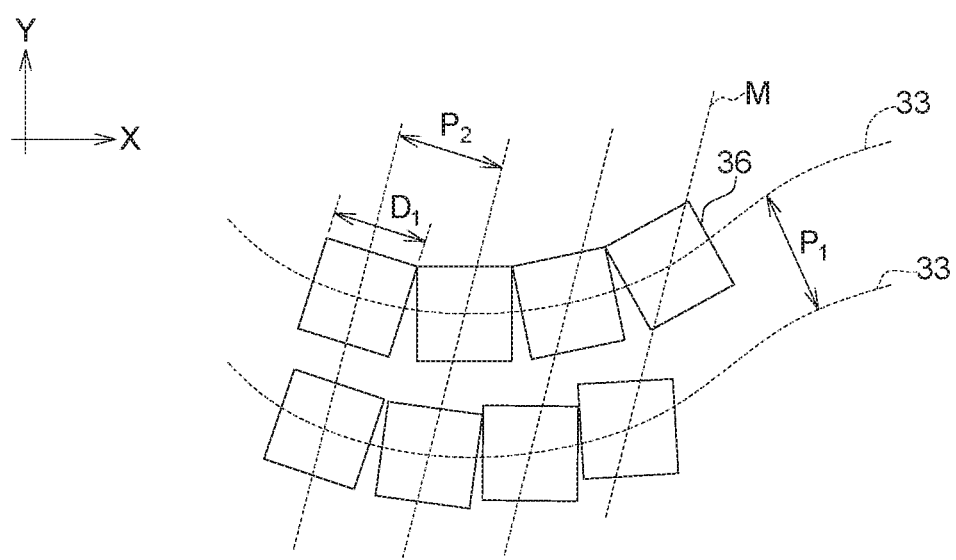

In another embodiment as indicated in FIG. 4B, eight square light deflection regions 36 are taken for illustration. The eight square light deflection regions 36 are arranged into two adjacent groups with each group having four square light deflection regions along a track 33 in a first direction (the directional angle ψ=0), and are arranged into four adjacent groups with each group having two square light deflection regions along a straight line M in a second direction (the directional angle ψ=70). The two tracks 33 are arranged with a first pitch $P_1$ in the second direction, and the four straight lines M are arranged with a second pitch $P_2$ in the first direction.

As disclosed in above embodiments, the light deflection regions are arranged along the first track in the first direction and arranged along the second track in the second direction. The first tracks are arranged with the first pitch $P_1$, that is, the first pitch $P_1$ refers to the distance between two closest first tracks, and the relationship between the first pitch $P_1$ and the characteristic dimension $D_1$ of light deflection regions can be expressed as: $0.1D_1 \leq P_1 \leq 25D_1$. Besides, the second tracks are arranged with the second pitch $P_2$, that is, the second pitch $P_2$ refers to the distance between two closest second tracks, and the relationship between the second pitch $P_2$ and the characteristic dimension $D_1$ of the light deflection regions can be expressed as: $0.1D_1 \leq P_2 \leq 25D_1$. In other embodiments, the ratio of the first pitch $P_1$ to the second pitch $P_2$ can be larger than or equivalent to 0.1, but smaller than or equivalent to 10, that is, $$0.1 \leq \frac{P_1}{P_2} \leq 10.$$

As disclosed in above embodiments, the relationship between the first pitch $P_1$ and the characteristic dimension $D_1$ of the light deflection regions can be expressed as: $0.5D_1 \leq P_1 \leq 10D_1$; the relationship between the second pitch $P_2$ and the characteristic dimension $D_1$ of the light deflection regions can be expressed as: $0.5D_1 \leq P_2 \leq 10D_1$. In the embodiments with more than two groups of the light deflection regions, the values of the first pitch $P_1$ and the second pitch $P_2$ can be fixed or variant, and can be adjusted according to actual needs. The concepts of pitches disclosed below are similar to that of the above embodiments, and the similarities are not repeated.

Even if the circular light deflection regions 32 are stacking with the periodically arranged pixel structures, there are misplacements between some of the circular light deflection regions 32 and the pixel structures (the locations are not corresponding), for the circular light deflection regions 32 are arranged along the track 33. Therefore, the moiré interference pattern (or ghost image) which affects the display quality will not be generated easily. Refer to FIG. 4B. The square light deflection regions 36 arranged along the tracks 33 also have the anti-interference effect. The anti-interference effect of the following embodiments is similar to that of the above embodiments, and the similarities are not repeated.

Figure 5A:
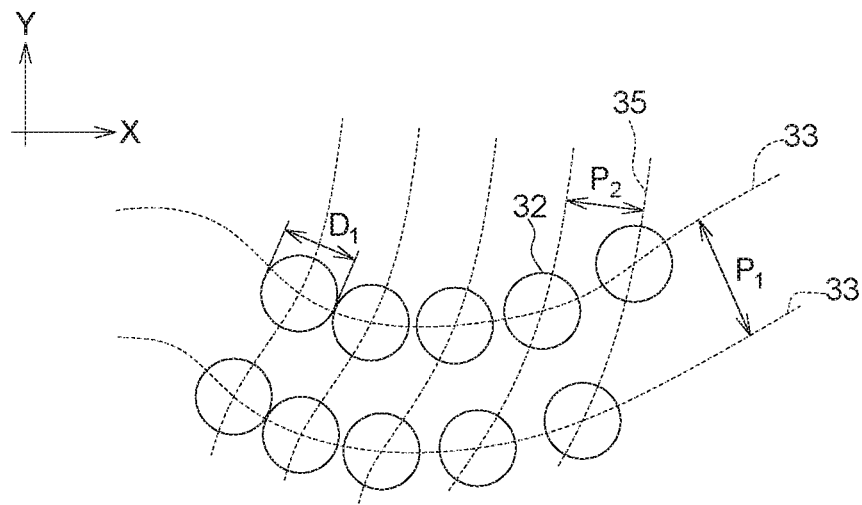
FIGS. 5A and 5B are schematic diagrams of the intersection of two sets of light deflection regions arranged along the tracks.

Refer to FIG. 5A, ten circular light deflection regions 32 are taken for illustration. The embodiment of FIG. 5A is different from that of FIG. 4A in that: the circular light deflection regions 32 are arranged into two adjacent groups with each group having five circular light deflection regions along a track 33 in a first direction (the directional angle ψ=0) and are arranged into five adjacent groups with each group having two circular light deflection regions along a track 35 in a second direction (the directional angle ψ=70), the included angle between the track 33 and track 35 can range from 30 to 150°, and the ratio of the first pitch $P_1$ to the second pitch $P_2$ can be larger than or equivalent to 0.1 but smaller than or equivalent to 10, that is, $$0.1 \leq \frac{P_1}{P_2} \leq 10.$$

Figure 5B:
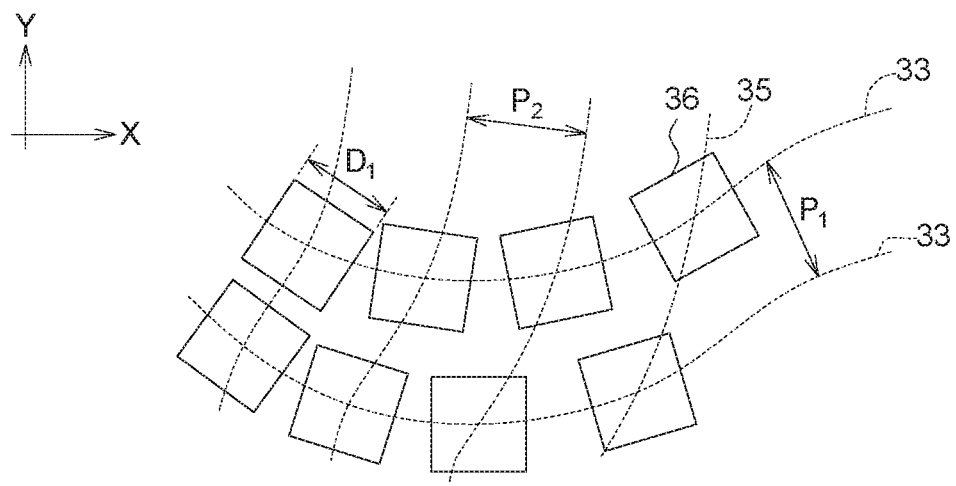

In the present embodiment, the relationship between the first pitch $P_1$ and the characteristic dimension $D_1$ of the light deflection regions can be expressed as: $1.1D_1 \leq P_1 \leq 20D_1$; the relationship between the second pitch $P_2$ and the characteristic dimension $D_1$ of the light deflection regions can be expressed as: $1.1D_1 \leq P_2 \leq 20D_1$, and the light deflection regions 32 are mutually separated without overlapping each other. Refer to FIG. 5B. The arrangement of the square light deflection regions 36 along the tracks 33 and 35 can be similar to the above arrangement.

In an embodiment, when the value of $$\frac{P_1}{D_1}$$

is smaller than 1 and/or the value of $$\frac{P_2}{D_1}$$

is smaller than 1, this implies that at least two groups of the circular light deflection regions 32 partly overlap with each other. When two groups of the circular light deflection regions 32 partly overlap with each other, the deflection effect of the overlapped part may be different from that of the non-overlapped part because the overlapped part and the non-overlapped part may have different patterns (that is, a first pattern and a second pattern having different shapes or different conditions). For example, by stacking two films of the optical element 20 together, one group of the circular light deflection regions 32 of the first pattern at least partly overlaps one group of the circular light deflection regions 32 of the second pattern. When a stacked structure formed of multilayers of optical element 20 is irradiated by a light source, a penetrating light will be generated in the deflecting direction of single layer of the optical element 20 as well as other deflecting directions (such as oblique directions), and the deflection effect can therefore be enhanced.

Figure 6A:
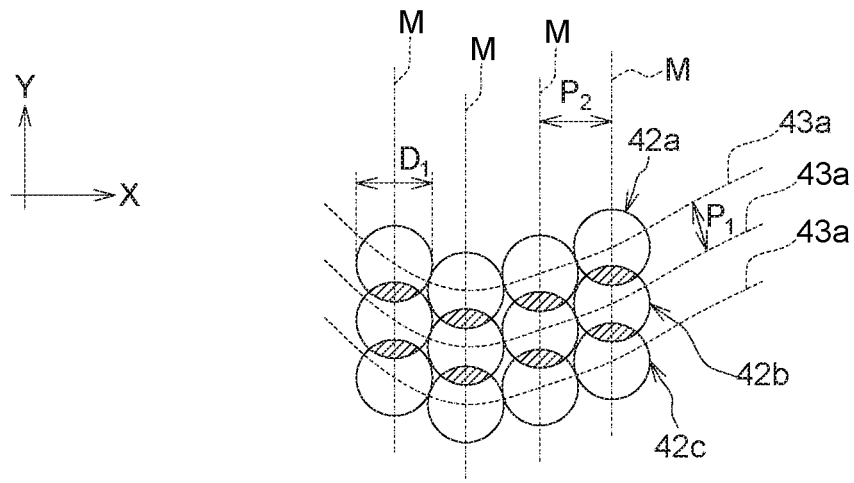
FIGS. 6A and 6B are schematic diagrams of three sets of partly overlapped light deflection regions arranged along the tracks.

Refer to FIG. 6A. Let 12 circular light deflection regions 42a, 42b and 42c be taken for illustration. The 4 circular light deflection regions 42a, the 4 circular light deflection regions 42b and the 4 circular light deflection regions 42c are arranged as three rows with each row having four circular light deflection regions along three tracks 43a in a first direction (the directional angle ψ=0) and are arranged as four columns with each column having three circular light deflection regions along four straight lines M in a second direction (the directional angle ψ=90). Tracks 43a are arranged with a first pitch $P_1$, and straight lines M are arranged with a second pitch $P_2$. It should be noted that the light deflection regions 42a, 42b and 42c can have the same or different sizes or shapes, and a circular shape is taken for illustration in the present embodiment. The light deflection regions 42a, 42b and 42c can be arranged along the same or different tracks in the first direction and the second direction respectively, and identical tracks 43a and identical straight lines M are taken for illustration in the present embodiment. The light deflection regions 42a, 42b and 42c can be mutually separated or at least partly overlapped with each other. In the present embodiment, the light deflection regions 42a and the light deflection regions 42b at least partly overlap with each other, and the light deflection regions 42b and the light deflection regions 42c at least partly overlap with each other, wherein the light deflection regions 42b are located between the light deflection regions 42a and the light deflection regions 42c. In the present embodiment, the first pitch $P_1$ between two adjacent tracks 43a is smaller than the characteristic dimension $D_1$ ($P_1 < D_1$), and the light deflection regions along each track 43a at least partly overlap with each other. In another embodiment, both the first pitch $P_1$ between two adjacent tracks 43a and the second pitch $P_2$ between two adjacent straight lines M are smaller than the characteristic dimension $D_1$ ($P_1<D_1$ and $P_2<D_1$), such that both the light deflection regions along each track 43a and the light deflection regions along each straight line M at least partly overlap with each other. Here, the light deflection regions can be formed on a single optical layer. In another embodiment, the light deflection regions can be light deflection regions on multilayered structure formed of multiple layers (two or more than two layers) of the optical element 20 stacked together. For example, the light deflection regions 42a and the light deflection regions 42c are located on a film of the optical element 20 to form the first pattern, and the light deflection regions 42b are located on the other film of the optical element 20 to form the second pattern, and the first pattern and the second pattern may have the same or different tracks.

Figure 6B:
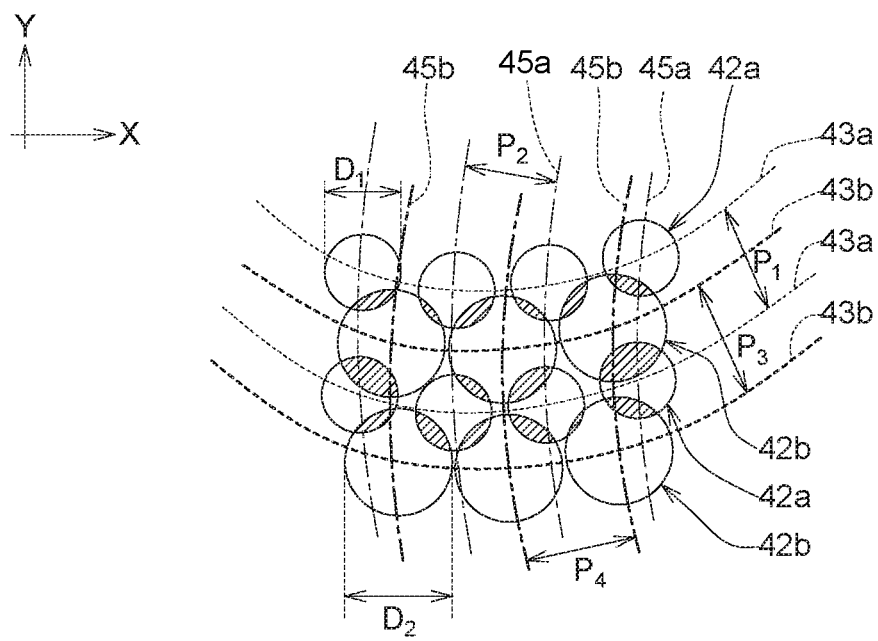

Referring to FIG. 6B, two types of light deflection regions 42a and 42b are exemplified for illustration. The light deflection regions 42a are arranged as two adjacent rows with each row having four light deflection regions 42a along a track 43a in a first direction (the directional angle ψ=0) and are arranged as four adjacent columns with each column having two light deflection regions 42a along a track 45a in a second direction (the directional angle ψ=90). The light deflection regions 42b are arranged as two adjacent rows with each row having three light deflection regions along a track 43b in the first direction (the directional angle ψ=0), and are arranged as three adjacent columns with each column having two light deflection regions along a track 45b in the second direction (the directional angle ψ=90). Every two adjacent tracks 43a are separated by a first pitch $P_1$, every two adjacent tracks 45a are separated by a second pitch $P_2$, every two adjacent tracks 43b are separated by a third pitch $P_3$, and every two adjacent tracks 45b are separated by a fourth pitch $P_4$. In an embodiment, the first pitch $P_1$ is different from the third pitch $P_3$, and/or the second pitch $P_2$ is different from the fourth pitch $P_4$. In an embodiment, the characteristic dimension $D_2$ of the light deflection regions 42b is larger than or smaller than the characteristic dimension $D_1$ of the light deflection regions 42a. In another embodiment, the characteristic dimension $D_2$ of the light deflection regions 42b is equivalent to the characteristic dimension $D_1$ of the light deflection regions 42a. Whether the light deflection regions 42a and 42b are mutually separated or at least partly overlap with each other can be determined according to the relative relationship between the pitches $P_1$, $P_2$, $P_3$ and $P_4$ and the characteristic dimensions $D_1$ and $D_2$. For example, when the first pitch $P_1$ and/or the third pitch $P_3$ is smaller than $D_1+D_2$ or when the second pitch $P_2$ and/or the fourth pitch $P_4$ is smaller than $D_1$, the light deflection regions may partly overlap with each other. Here, the light deflection regions can be formed on a single optical layer. In another embodiment, the light deflection regions can be light deflection regions on multilayered structure formed of multiple layers (two or more than two layers) of the optical element 20 stacked together. For example, the light deflection regions 42a are located on a film of the optical element 20 to form the first pattern, and the light deflection regions 42b are located on the other film of the optical element 20 to form the second pattern, wherein the first pattern and the second pattern may have the same or different tracks.

Figure 7A:
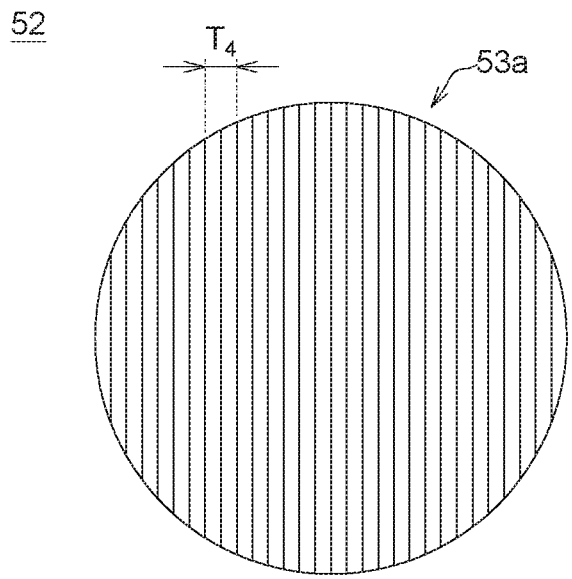
FIG. 7A is a schematic diagram of a diffraction structure having a single period.

The light deflection regions can be realized by diffraction structures having deflection effect and are exemplified below. The light deflection regions may include a diffraction structure having a single period. Refer to FIG. 7A. The light deflection regions 52 include a diffraction structure 53a having a single period. For example, the diffraction structure 53a is a grating structure having a single period. The light deflection regions may include a diffraction structure having variant periods (also referred as "multiple periods"), that is, the diffraction structure may include a grating structure having two or more than two periods. Refer to FIGS. 7B-7E. The diffraction structures 53b-53e are grating structures having multiple periods, and the grating periods range from 0.4 to 10 μm.

In an embodiment, the diffraction structure of the light deflection regions include at least two grating groups with each group having at least one grating unit, and the grating units in the same grating group have the same grating period. If the largest grating period of each grating group of the diffraction structure is defined as C, then the variation of the grating period between two closest grating groups is equivalent to at least 1% of the largest grating period C or is smaller than 90% of the largest grating period C. For example, if the largest grating period is equivalent to 2 μm, then the variation of the grating period between two closest grating groups is equivalent to at least 0.02 μm or is smaller than 1.8 μm. In another embodiment, if the variation between the largest grating period and the smallest grating period of the diffraction structure is defined as ΔC, then the variation of the grating period between two closest grating groups ranges from 5% to 100% of the variation ΔC. For example, if the variation ΔC between the largest grating period and the smallest grating period is equivalent to 1.2 μm, then the variation of the grating period between two closest grating groups is equivalent to 0.06-1.2 μm.

Figure 7B:
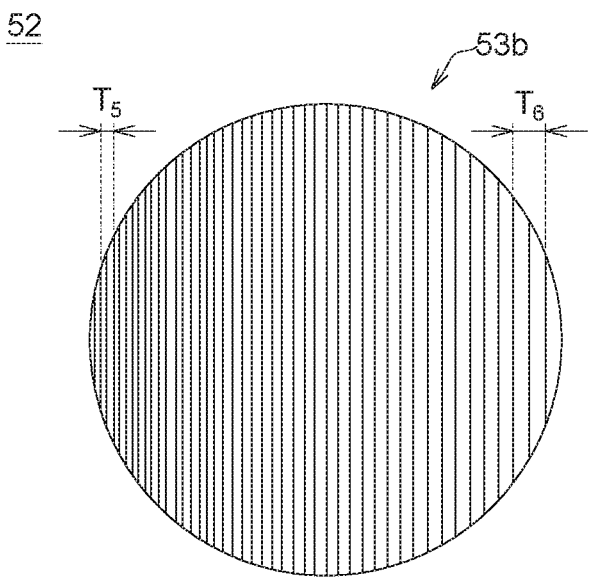
FIGS. 7B-7E are schematic diagrams of diffraction structures having two or more than two periods.
Figure 7C:
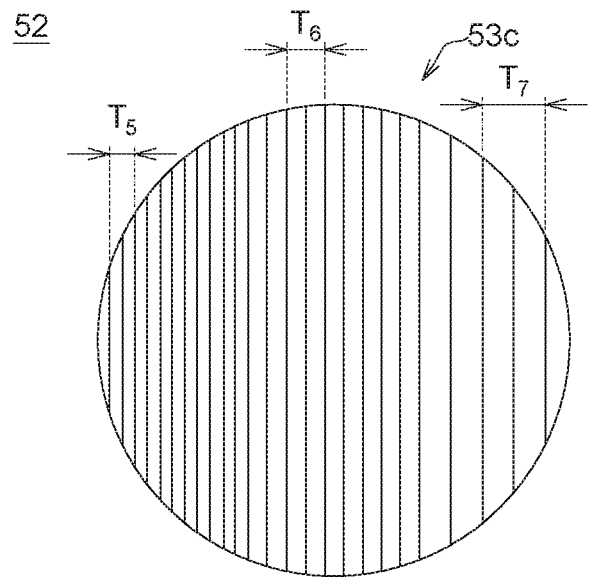
Figures 7D, 7E:
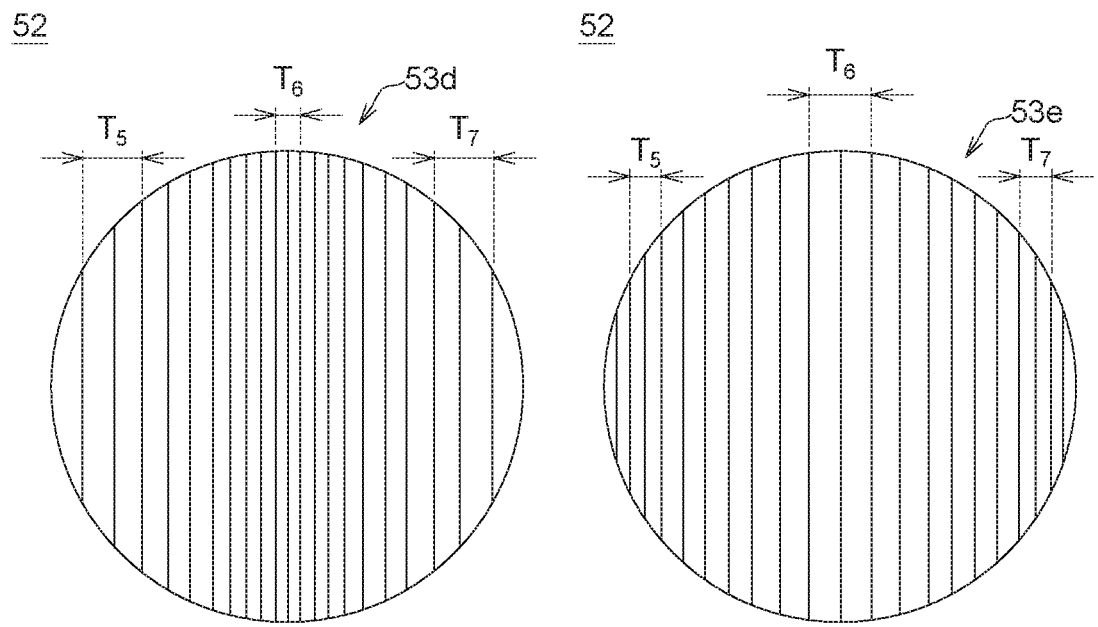

Four implementations of the light deflection regions as illustrated in FIGS. 7B~7E and are described below. In the present embodiment, the grating unit is exemplified by strip-shaped grating bars. As indicated in FIG. 7B, the light deflection region 52 has 20 grating groups with each group having a grating bar, and the grating groups are arranged to form a diffraction structure 53b having gradient periods in a single direction. For example, the grating periods progressively increase to the second period $T_6$ (such as 2.0 μm) from the first period $T_5$ (such as 0.8 μm) to form a diffraction structure 53b whose grating units have decreasing densities. In the present embodiment, since each grating bar has a different grating period, the grating periods are defined as gradient periods. As indicated in FIG. 7C, the diffraction structure 53c of the light deflection regions 52 has three grating groups each having 3-6 grating bars, and the grating periods of the grating groups progressively increase in a single direction. For example, the grating periods can progressively increase to the second period $T_6$ (such as 1.3 μm) from the first period $T_5$ (such as 0.8 μm), and then further progressively increase to the third period $T_7$ (such as 2.0 μm) from the second period $T_6$ to form a diffraction structure 53c whose grating units have decreasing densities. As indicated in FIG. 7D, the light deflection regions 52 has 10 grating groups each having one grating bar, and the grating groups are arranged to form a diffraction structure 53d having bilateral gradient periods. For example, the grating periods can progressively decrease to the second period $T_6$ (such as 0.8 μm) from the first period $T_5$ (such as 2.0 μm), and then progressively increase to the third period $T_7$ (such as 2.0 or 1.3 μm) from the second period $T_6$ to form a diffraction structure 53d whose grating units have increasing densities first and then have decreasing densities, wherein the density is higher at the middle part but lower at the two lateral sides. As indicated in FIG. 7E, the light deflection regions 52 has 10 grating group each having one grating, and the grating groups are arranged to form a diffraction structure 53e having bilateral gradient periods. For example, the grating periods can progressively increase to the second period $T_6$ (such as 2.0 µm) from the first period $T_5$ (such as 0.8 µm), and then progressively decrease to the third period $T_7$ (such as 0.8 or 1.3 µm) from the second period $T_6$ to form a diffraction structure 53e, wherein the density is lower at the middle part but higher at the two lateral sides.

In comparison to the diffraction structure 53a arranged according to one single period, the diffraction structures 53b-53e of the present embodiments have variant periods, and are less likely to generate interfering moiré pattern (or ghost image) and will not affect the display effect.

Figure 8A:
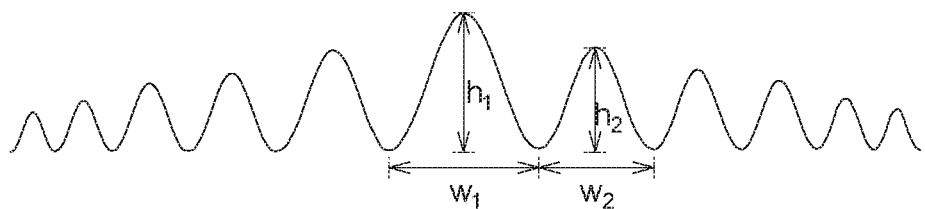
FIGS. 8A-8C are side views of diffraction structures having gradient periods (or gradient densities) and gradient amplitudes.
Figure 8B:
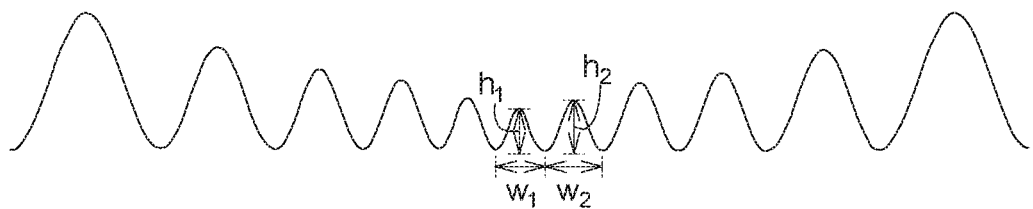

In other embodiments, the problem of moiré pattern can be resolved by adjusting the ratio of grating period to amplitude. As disclosed above, the diffraction structure of the light deflection regions may include multiple grating units having different grating periods. The relation between the grating period and the amplitude is described below using the diffraction structure having gradient periods. Refer to FIGS. 8A and 8B, side views of diffraction structures 63a and 63b having gradient periods (or gradient density) and gradient amplitudes are shown. As indicated in FIG. 8A, when the periods of the grating units of the diffraction structure 63a progressively decrease towards the two lateral sides from the central region of the diffraction structure 63a, the amplitudes of the grating units may progressively decrease towards the two lateral sides from the central region of the diffraction structure 63a. As indicated in FIG. 8B, when the periods of the grating units of the diffraction structure 63b progressively increase towards the two lateral sides from the central region of the diffraction structure 63b, the amplitudes of the grating units may progressively increase towards the two lateral sides from the diffraction structure 63b. Designations $w_1$ and $h_1$ respectively denote the period and the amplitude of the grating units at the central region of the diffraction structures 63a and 63b, and designations $w_2$ and $h_2$ respectively denote the amplitude of the grating units near the two lateral sides. In the two embodiments disclosed above, the period $w_1$ of the grating units at the central region can be larger than or smaller than towards the period $w_2$ of the grating units near the two lateral sides, that is, $w_1>w_2$ or $w_1<w_2$. Furthermore, the amplitude $h_1$ of the grating units at the central region can be larger than or smaller than the amplitude $h_2$ of the grating units near the two lateral sides, that is, $h_1>h_2$ or $h_1<h_2$. In an embodiment, the aspect ratio of the grating units at the central region is equivalent to the ratio of the amplitude $h_1$ to the period $w_1$, and may range from 0.1 to 10; the aspect ratio of the grating units near the two lateral sides is equivalent to the ratio of the amplitude $h_2$ to the period $w_2$, and may range from 0.1 to 10. When the value of $$\frac{h_1}{w_1}$$

is equivalent to that of $$\frac{h_2}{w_2},$$

this implies that both the periods and the amplitudes of the grating units of the diffraction structures 63a and 63b vary proportionally and progressively (such as progressively increase or progressively decrease) towards the two lateral sides from the central region. Thus, the deflection effect of the diffraction structures 63a and 63b can be changed by changing the periods and the amplitudes of the grating units.

Figure 8C:
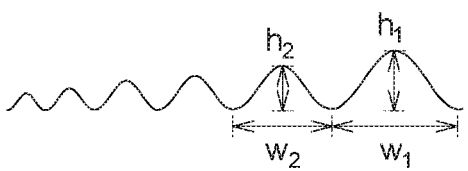

Refer to FIG. 8C. The periods and the amplitudes of the grating units of the diffraction structure 63c may vary progressively from one side towards the other side of the diffraction structure 63c. In an embodiment, the value of $$\frac{h_1}{w_1}$$

is equivalent to 0.5, and the value of $$\frac{h_2}{w_2}$$

is equivalent to 0.5. When the value of $$\frac{h_1}{w_1}$$

is equivalent to that of $$\frac{h_2}{w_2},$$

this implies that the periods and the amplitudes of the grating units of the diffraction structure 63c vary proportionally and progressively (such as progressively increase or progressively decrease) from one side towards the other side of the diffraction structure 63c. Thus, the deflection effect of the diffraction structure 63c can be changed by changing the periods and the amplitudes of the grating units.

Figure 9A:
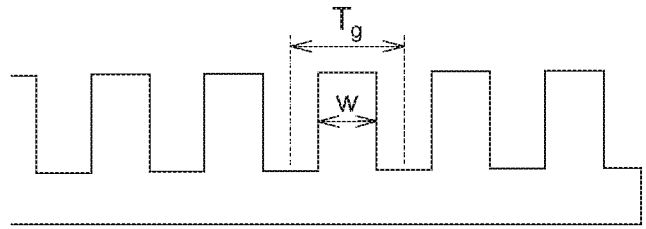
FIGS. 9A-9D are FWHM (full width at half maximum) diagrams of four different types of diffraction structures.
Figure 9B:
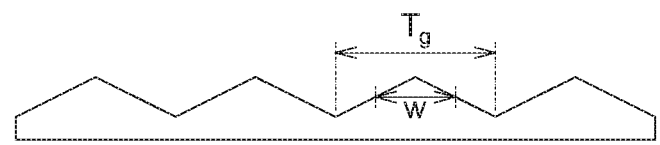
Figure 9C:
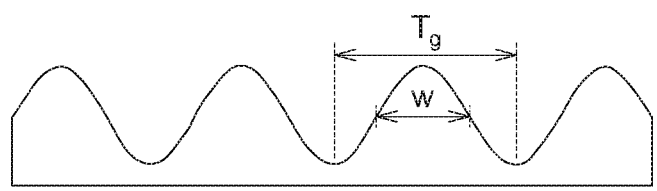
Figure 9D:
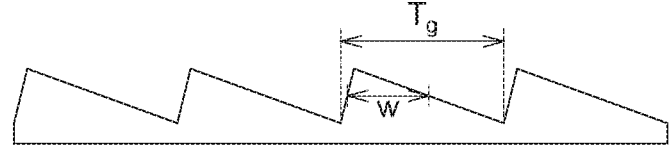

Refer to FIGS. 9A to 9D. FIG. 9A is a FWHM (full width at half maximum) diagram of a square waveform diffraction structure 72a. FIG. 9B is a FWHM diagram of a serrated waveform diffraction structure 72b. FIG. 9C is a FWHM diagram of a sine waveform diffraction structure 72c. FIG. 9D is a FWHM diagram of an obliquely serrated waveform diffraction structure 72d. Designation $T_g$ denote the period of the diffraction structure having a single period, and designation w denote the width (that is, the FWHM width) at which the amplitude is equivalent to ½ of the height. In an embodiment, the ratio of the FWHM w to the period $T_g$ can range from 0.1 to 0.9. Thus, the deflection effect of the diffraction structure can be changed by changing the waveform and the FWHM width of the diffraction structure.

According to the optical element and the display device using the same disclosed in above embodiments of the invention, the light deflection regions arranged along the waveform track, the moiré pattern generated due to periodic arrangement can be eliminated without affecting the display effect of the display device. Moreover, the diffraction structure having variant periods can also eliminate the moiré pattern generated due to periodic arrangement without affecting the display effect of the display device.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An optical element, comprising:
a first pattern, comprising:
a plurality of light deflection regions arranged along at least one set of first tracks in a first direction, wherein each first track is a waveform track having a first period $T_1$ and a first amplitude $A_1$, wherein the light deflection regions have a characteristic dimension D, and $T_1$, $A_1$ and D satisfy the following expressions:

$$A_1 \geq 2D; \qquad (1)$$

$$T_1 \geq 2D; \text{ and} \qquad (2)$$

$$0 < \frac{A_1}{T_1} \leq 10. \qquad (3)$$

2. The optical element according to claim 1, wherein each first track is a sine function or a Fourier series represented as the sum of a plurality of sine functions.

3. The optical element according to claim 1, wherein the light deflection regions are arranged along at least one set of second tracks in a second direction different from the first direction.

4. The optical element according to claim 3, wherein each second track is a straight line.

5. The optical element according to claim 3, wherein each second track is a waveform track having a second period $T_2$ and a second amplitude $A_2$.

6. The optical element according to claim 5, wherein each second track is a sine function or a Fourier series represented as the sum of a plurality of sine functions, and $T_2$, $A_2$ and a characteristic dimension D of the light deflection regions satisfy the following expressions:

$$A_2 \geq 2D; \qquad (1)$$

$$T_2 \geq 2D; \text{ and} \qquad (2)$$

$$0 < \frac{A_2}{T_2} \leq 1. \qquad (3)$$

7. The optical element according to claim 6, wherein $$\frac{A_1}{T_1} > \frac{A_2}{T_2}.$$

8. The optical element according to claim 3, wherein the first tracks are arranged with a first pitch $P_1$ in the second direction, and $0.1D \leq P_1 \leq 25D$; and the second tracks are arranged with a second pitch $P_2$ in the first direction, and $0.1D \leq P_2 \leq 25D$.

9. The optical element according to claim 8, wherein $$0.1 \leq \frac{P_1}{P_2} \leq 10.$$

10. The optical element according to claim 1, wherein each of the light deflection regions comprises a diffraction structure having two or more than two types of periods.

11. The optical element according to claim 1, wherein each of the light deflection regions comprises a diffraction structure having two or more than two types of amplitudes.

12. The optical element according to claim 1, wherein each of the light deflection regions comprises a diffraction structure arranged according to at least one of a gradient period and a gradient amplitude.

13. A display device, comprising:
a display; and
the optical element according to claim 1 disposed on a light output surface of the display.

14. An optical element, comprising:
a film; and
a plurality of light deflection regions arranged on the film, wherein each light deflection region comprises a diffraction structure having two or more than two types of periods, wherein the diffraction structure include at least two grating groups, and a variation of the grating period between two closest grating groups ranges from 5% to 100% of the variation ΔC, wherein the ΔC is a variation between a largest grating period and a smallest grating period of the diffraction structure.

15. The optical element according to claim 14, wherein each of the light deflection regions comprises a diffraction structure having two or more than two types of amplitudes.

16. The optical element according to claim 14, wherein each of the light deflection region comprises a diffraction structure arranged according to at least one of a gradient period and a gradient amplitude.

17. A display device, comprising:
a display; and
the optical element according to claim 14 disposed on a light output surface of the display.

18. An optical element, comprising:
a film; and
a plurality of light deflection regions arranged on the film, wherein each light deflection region comprises a diffraction structure having two or more than two types of periods, wherein the diffraction structure include at least two grating groups, and a variation of the grating period between two closest grating groups is equivalent to at least 1% of the largest grating period C or is smaller than 90% of the largest grating period C.

* * * * *